(12) United States Patent
Jeon et al.

(10) Patent No.: US 8,386,760 B2
(45) Date of Patent: Feb. 26, 2013

(54) ELECTRONIC APPARATUS AND BOOTING METHOD OF THE SAME

(75) Inventors: Nam-jae Jeon, Suwon-si (KR); Prabhu Kaliamoorthi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 12/623,764

(22) Filed: Nov. 23, 2009

(65) Prior Publication Data
US 2010/0306520 A1 Dec. 2, 2010

(30) Foreign Application Priority Data

May 27, 2009 (KR) .......................... 10-2009-0046450

(51) Int. Cl.
*G06F 9/00* (2006.01)
*G06F 15/177* (2006.01)
(52) U.S. Cl. ................. 713/2; 713/1; 711/200; 711/202
(58) Field of Classification Search .................. 713/1, 2; 711/200, 202
See application file for complete search history.

(56) References Cited

U.S. PATENT DOCUMENTS

| 5,430,858 | A | 7/1995 | Greeley et al. |
| 2004/0073783 | A1 | 4/2004 | Ritchie |
| 2005/0223209 | A1* | 10/2005 | Chang ............................... 713/2 |
| 2006/0136765 | A1* | 6/2006 | Poisner et al. ................. 713/323 |

FOREIGN PATENT DOCUMENTS

WO 2008/048581 A1 4/2008

OTHER PUBLICATIONS

Extended European Search Report issued Dec. 18, 2009 in counterpart European Application No. 09176732.7.

\* cited by examiner

*Primary Examiner* — Jaweed A Abbaszadeh
(74) *Attorney, Agent, or Firm* — Sughrue Mion, PLLC (57) ABSTRACT

An electronic apparatus and a booting method of the same are provided. The booting method of the electronic apparatus, including a non-volatile first storage unit storing a device initialization file and a device execution file, and a volatile second storage unit, includes: loading the device execution file from the first storage unit into the second storage unit at an initial booting; generating reference information about the loaded device execution file; maintaining power supplied to the second storage unit when the electronic apparatus is turned off; loading and executing the device initialization file from the first storage unit into the second storage unit at a rebooting; and executing the device execution file stored in the second storage unit with reference to the reference information.

16 Claims, 6 Drawing Sheets

ELECTRONIC APPARATUS AND BOOTING METHOD OF THE SAME

CROSS-REFERENCE TO RELATED APPLICATION

This application claims priority from Korean Patent Application No. 10-2009-0046450, filed on May 27, 2009, in the Korean Intellectual Property Office, the disclosure of which is incorporated herein by reference.

BACKGROUND OF INVENTION

1. Field

Apparatuses and methods consistent with the inventive concept relate to an electronic apparatus and a booting method of the same, and more particularly, to an electronic apparatus having a self-refreshable storage medium and a booting method of the same.

2. Description of the Related Art

An electronic apparatus such as a television or a computer performs a booting up process for system initialization when turned on. In general, the booting process includes loading data such as a device execution file and an operating system (OS) kernel into a memory such as a random access memory (RAM). The data is loaded into the RAM from a non-volatile storage medium such as a hard disk or a flash memory.

A total booting time of the electronic apparatus depends on a time taken to load the data into the RAM, and more particularly, a time taken to load the device execution file. When the data is slowly loaded, the booting time becomes longer.

SUMMARY

One or more exemplary embodiments provide an electronic apparatus having an improved booting speed and a booting method of the same.

One or more exemplary embodiments provide an electronic apparatus which permits easy design variations needed to shorten a booting time and a booting method of the same.

According to an aspect of an exemplary embodiment, there is provide a booting method of an electronic apparatus including a non-volatile first storage unit storing a device initialization file and a device execution file, and a volatile second storage unit, the booting method including: loading the device execution file from the first storage unit into the second storage unit and generating reference information about the loaded device execution file at an initial booting; and loading and executing the device initialization file from the first storage unit into the second storage unit and executing the device execution file stored in the second storage unit with reference to the reference information at a rebooting.

The reference information may include a memory mapping information of the device execution file.

The booting method may further include generating a page list corresponding to page information of the device execution file using the reference information before the executing the device execution file.

The executing the device execution file may include storing the page list in a page cache; and executing the device execution file using the stored page list.

The booting method may further include determining whether the reference information exists; and performing a memory reset for initializing the second storage unit if the reference information is determined not to exist.

The second storage unit may have a higher processing speed than the first storage unit.

The generating the reference information may further include generating a booting mark for indicating that the initial booting has been performed.

The rebooting may be performed when the booting mark is determined to exist in the reference information.

According to an aspect of an exemplary embodiment, there is provide an electronic apparatus including: a non-volatile first storage unit wherein a device initialization file and a device execution file are stored; a volatile second storage unit in which power supplied thereto is maintained when the electronic apparatus is turned off; and a controller which loads the device execution file from the first storage unit into the second storage unit at an initial booting, generates reference information about the loaded device execution file, maintaining power supplied to the second storage unit when the electronic apparatus is turned off, and loads and executes the device initialization file from the first storage unit into the second storage unit at a rebooting, and executes the device execution file stored in the second storage unit with reference to the reference information.

The second storage unit may include a dynamic random access memory (DRAM).

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Exemplary embodiments will be described in detail below with reference to accompanying drawings so as to be easily realized by a person having ordinary knowledge in the art. The present invention may be embodied in various forms without being limited to the exemplary embodiments set forth herein. Descriptions of irrelevant parts are omitted for clarity, and like reference numerals refer to like elements throughout.

Figure 1:
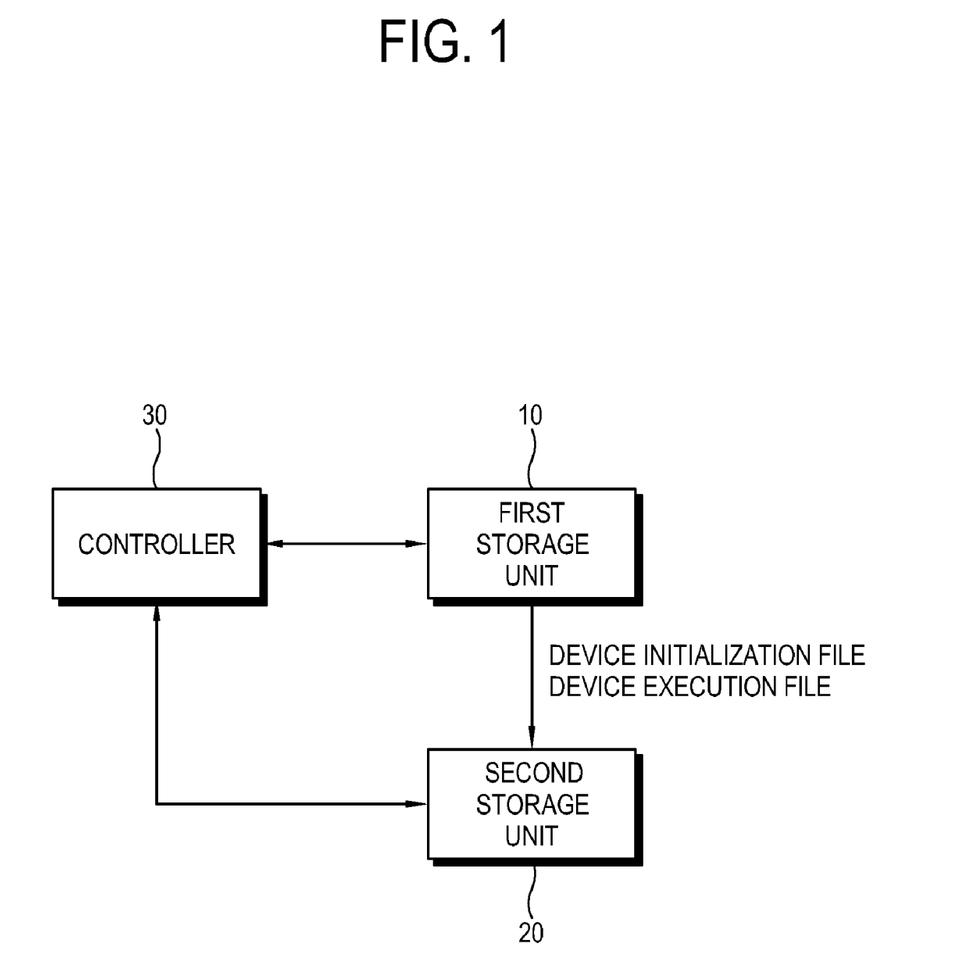
FIG. 1 is a control block diagram of an electronic apparatus according to an exemplary embodiment.

FIG. 1 is a control block diagram of an electronic apparatus according to an exemplary embodiment.

As shown therein, the electronic apparatus includes a first storage unit 10, a second storage unit 20, and a controller 30 controlling the first storage unit 10 and the second storage unit 20. In this exemplary embodiment, the electronic apparatus may be a video processing apparatus including a television or a computer, and an audiovisual apparatus. When powered, the electronic apparatus starts booting up for system initialization in response to a control signal for use of the electronic apparatus. If the electronic apparatus is the video processing apparatus, the typical booting process may include a series of processes which are performed after powering on the apparatus and before displaying an image on an image display unit (not shown).

The first storage unit 10 includes a non-volatile memory that stores a device initialization file for the booting and a device execution file. The non-volatile memory is a memory that can retain stored data even when it is not powered. In this exemplary embodiment, the first storage unit 10 may include at least one of a hard disk, a magnetic tape, a floppy disk, and a flash memory. Typically, the hard disk or the flash memory has a data processing speed which is lower than that of the second storage unit 20, described below. Accordingly, the controller 30 loads the stored data of the first storage unit 10 into the second storage unit 20 and performs operations using the data, i.e., executes a file.

In this exemplary embodiment, the device initialization file is an operating system that includes a boot loader and a kernel. In other words, the device initialize file refers to all files which are loaded prior to execution files. However, embodiments are not limited to a file name or the sort of the file described in this specification. Also, the device execution file includes an application execution file, an image, or any other file which is loaded from the first storage unit 10 into the second storage unit 20 by execution of the kernel. The device execution file includes files that do not depend on devices included in the electronic apparatus and have no effect on initialization of the device.

The second storage unit 20 includes a volatile memory that requires power to maintain the stored data. The second storage unit 20 corresponds to a main memory to be loaded with the stored data of the first storage unit 10 when the electronic apparatus is operated, and has a data processing speed higher than that of the first storage unit 10. The volatile memory includes a static random access memory (SRAM) and a dynamic random access memory (DRAM). In this exemplary embodiment, the second storage unit 20 includes the DRAM that can be self-refreshed to retain the data. The DRAM is a storage medium that has been widely used since it has a high data processing speed and is inexpensive. The DRAM includes various modules such as a single inline package (SIP), a single inline memory module (SIMM), a dual inline memory module (DIMM), a rambus inline memory module (RIMM), etc., and a single data rate synchronous dynamic random access memory (SDR-SDRAM), a double data rate synchronous dynamic random access memory (DDR-SDRAM), etc., which communicate data by synchronizing with a clock signal.

The controller 30 controls loading of data between the first storage unit 10 and the second storage unit 20 and performs the booting process. For convenience of description, the controller 30 is illustrated as one control block, but substantially refers to a set of controllers that perform various functions. The controller 30 includes a central processing unit (CPU) that controls general functions of the system and carries out data operations; a memory controller that directly controls the storage units 10 and 20 and regulates the loading of data; and a power controller that controls power supplied to the system. Such a plurality of controllers may be substantially merged into a single chip or divided into hardware parts.

The controller 30 in this exemplary embodiment carries out initial booting corresponding to the first booting of the electronic apparatus, and rebooting implemented after the initial booting, in which the initial booting and the rebooting are different processes. The initial booting refers to a booting process performed after the electronic apparatus, which is not being powered by an alternating current (AC) power, is turned on, and the rebooting refers to a booting process performed when the electronic apparatus, which is being powered, is turned off by a user and turned on again. That is, to carry out the rebooting, the initial booting must have been performed prior to the user turning off the electronic apparatus. Also, before the rebooting, a standby state must exist in which the AC power is supplied to the electronic apparatus. For example, the booting carried out after the electronic apparatus, which is not plugged in, is powered by the AC power, is called the initial booting, and the booting carried out after turning of a television through a remote controller is called the rebooting.

Figure 2:
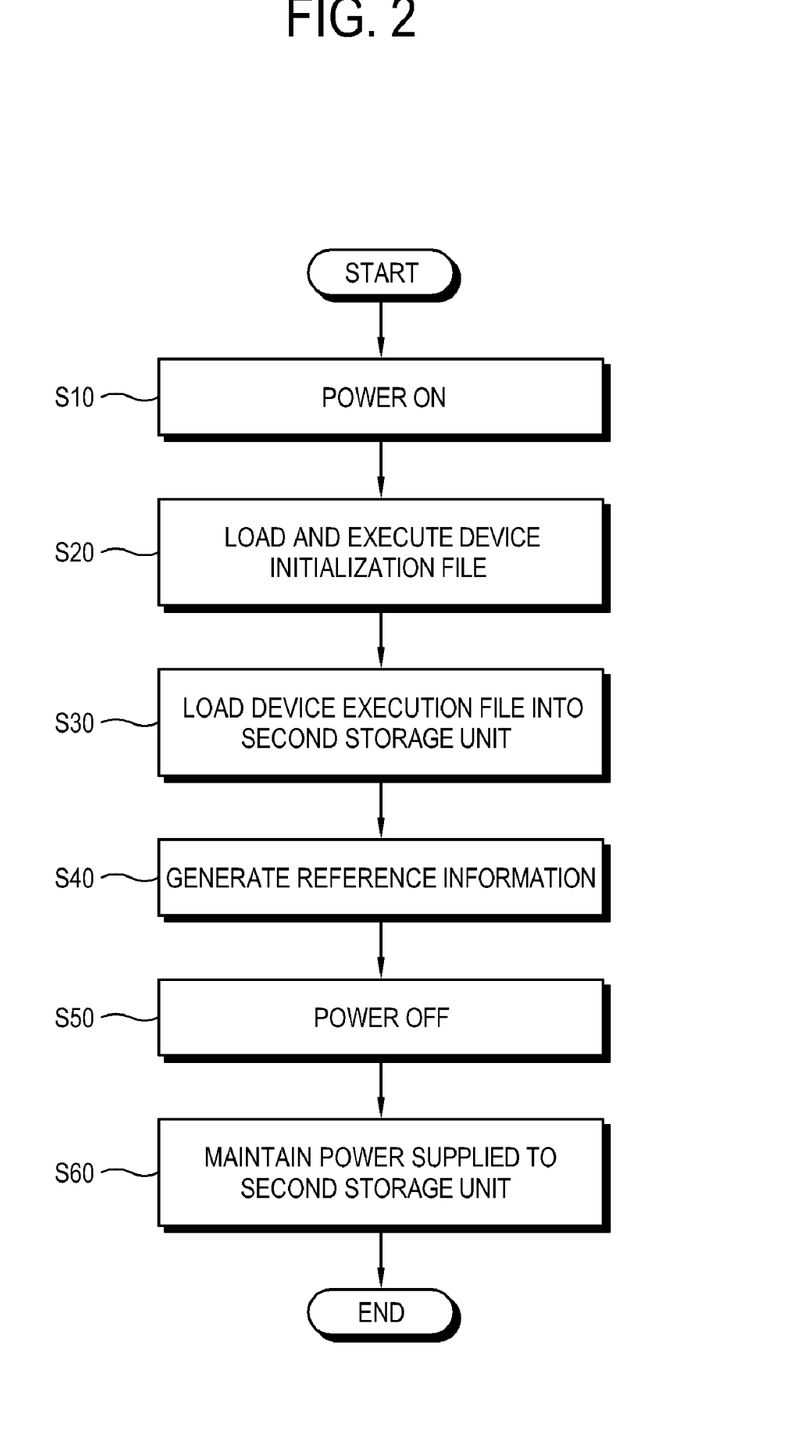
FIG. 2 is a control flowchart showing an initial booting process of the electronic apparatus in FIG. 1.
Figure 3:
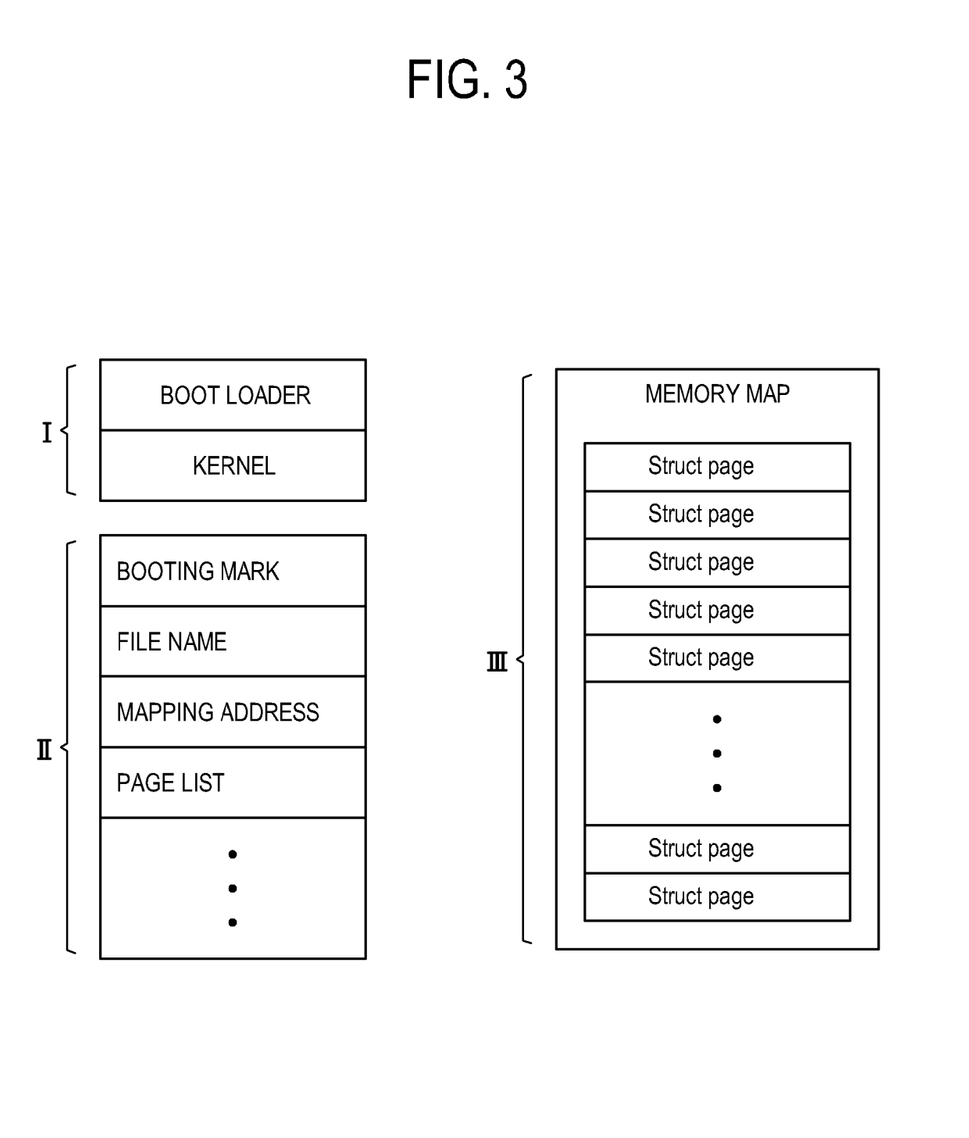
FIG. 3 illustrates a second storage unit used in the initial booting process of the electronic apparatus in FIG. 1.

FIG. 2 is a control flowchart showing an initial booting process of the electronic apparatus in FIG. 1, and FIG. 3 illustrates a second storage unit used in the initial booting process of the electronic apparatus in FIG. 1, according to an exemplary embodiment. The initial booting process will be described with reference to FIGS. 2 and 3.

First, at operation S10, the controller 30 receives a user control signal for the use of the electronic apparatus, i.e., a power-on signal, and carries out a power-on self test (POST) process to check power supplied to each device of the electronic apparatus.

After the POST process, the device initialization file I for initializing the electronic apparatus is loaded from the first storage unit 10 into the second storage unit 20, and the loaded device initialization file is executed at operation S20. As described above, the device initialization file includes the boot loader and the operating system. When the boot loader is loaded and executed, the booting process is implemented by the kernel of the operating system.

Then, the controller 30 loads the device execution file stored in the first storage unit 10 into the second storage unit 20 at operation S30, and generates reference information II and III to be referred to for the rebooting at operation S40.

The controller 30 uses a boot memory allocator to allocate a new data area in a certain area of the second storage unit 20 when opening a file to load the device execution file into the second storage unit 20. In the new data area, a booting mark for indicating that the initial booting has been performed, a name of the loaded device execution file, and a mapping address corresponding to the device execution file, and a storage space is provided for creating a page list at the rebooting. The controller 30 creates the reference information II in the form of a tree structure in the new data area so that a quick search can be enabled.

Further, the controller 30 generates a memory map III describing the data structure of the second storage unit 20 when the device execution file is loaded into the second storage unit 20. The memory map III is a page structure corresponding to a data block of the device execution file, and corresponds to a memory layout. In this exemplary embodiment, the reference information II and III includes the booting mark, the name of the device execution file, and the mapping address which are created in the new data area and the memory map. The reference information II and III is used as reference so that the device execution file can be called for the rebooting even though the device execution file is not loaded from the first storage unit 10 into the second storage unit 20.

At operation S50, the controller 30 finishes the rest of a series of booting processes, and turns off the electronic apparatus when the use of the electronic apparatus is ended by a user.

Although the electronic apparatus is turned off, the power supplied to the second storage unit 20 is maintained to retain data, and the second storage unit 20 is self-refreshed. Thus, the device execution file loaded into the second storage unit 20 is not deleted but survives even though the electronic apparatus is turned off.

Figure 4:
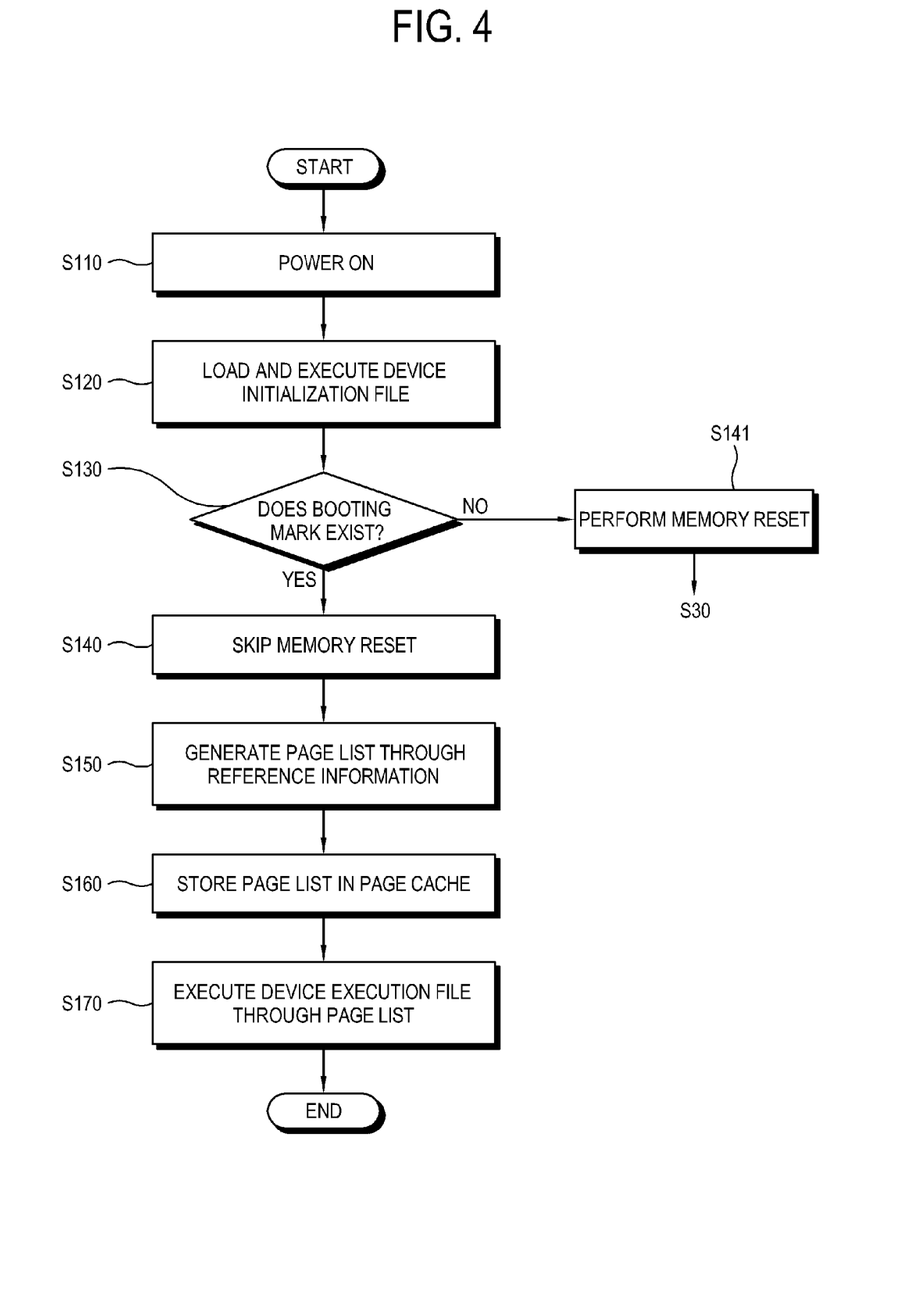
FIG. 4 is a control flowchart showing a rebooting process of the electronic apparatus in FIG. 1.
Figure 5:
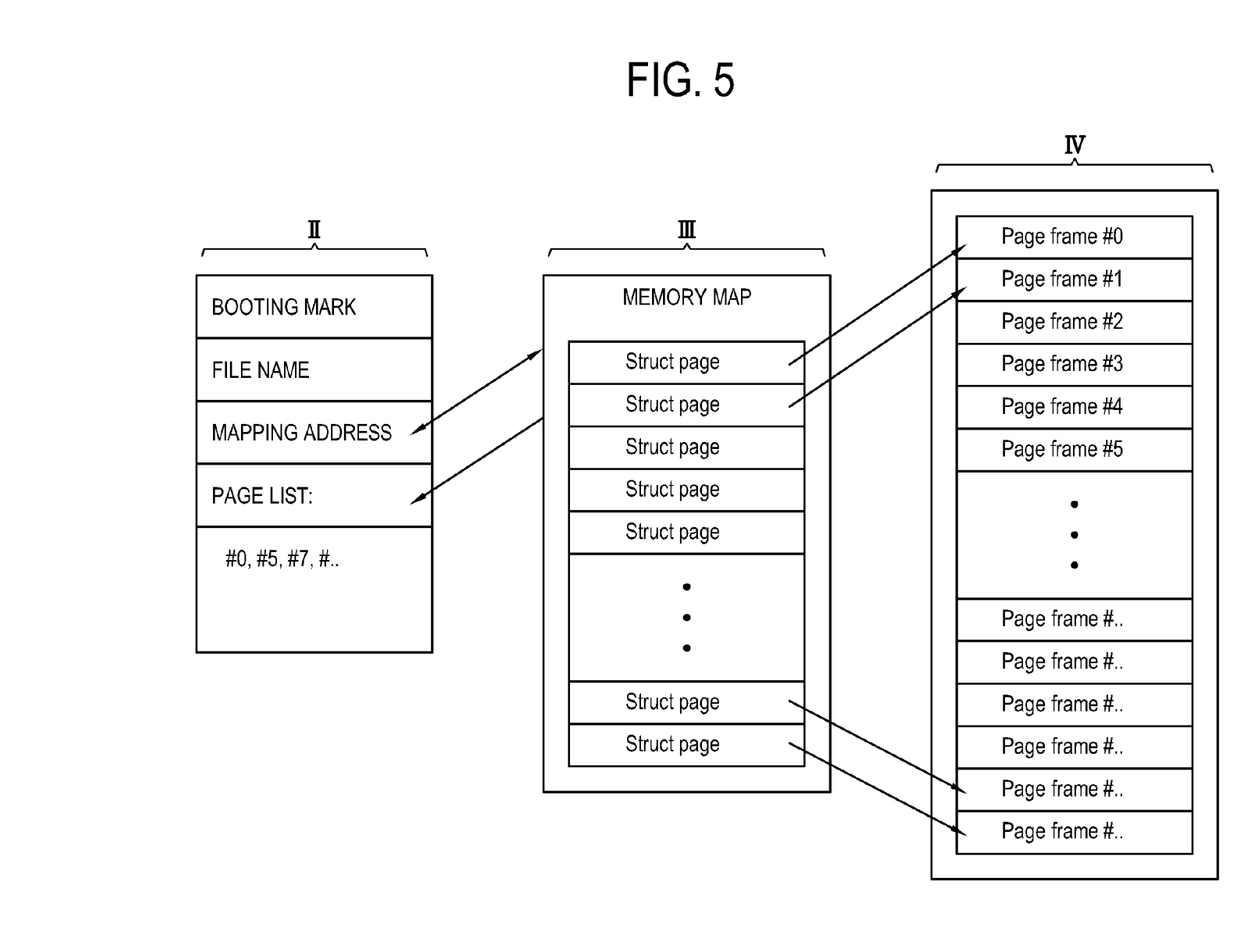
FIG. 5 illustrates the second storage unit including a page list which is generated when rebooting the electronic apparatus in FIG. 1.
Figure 6:
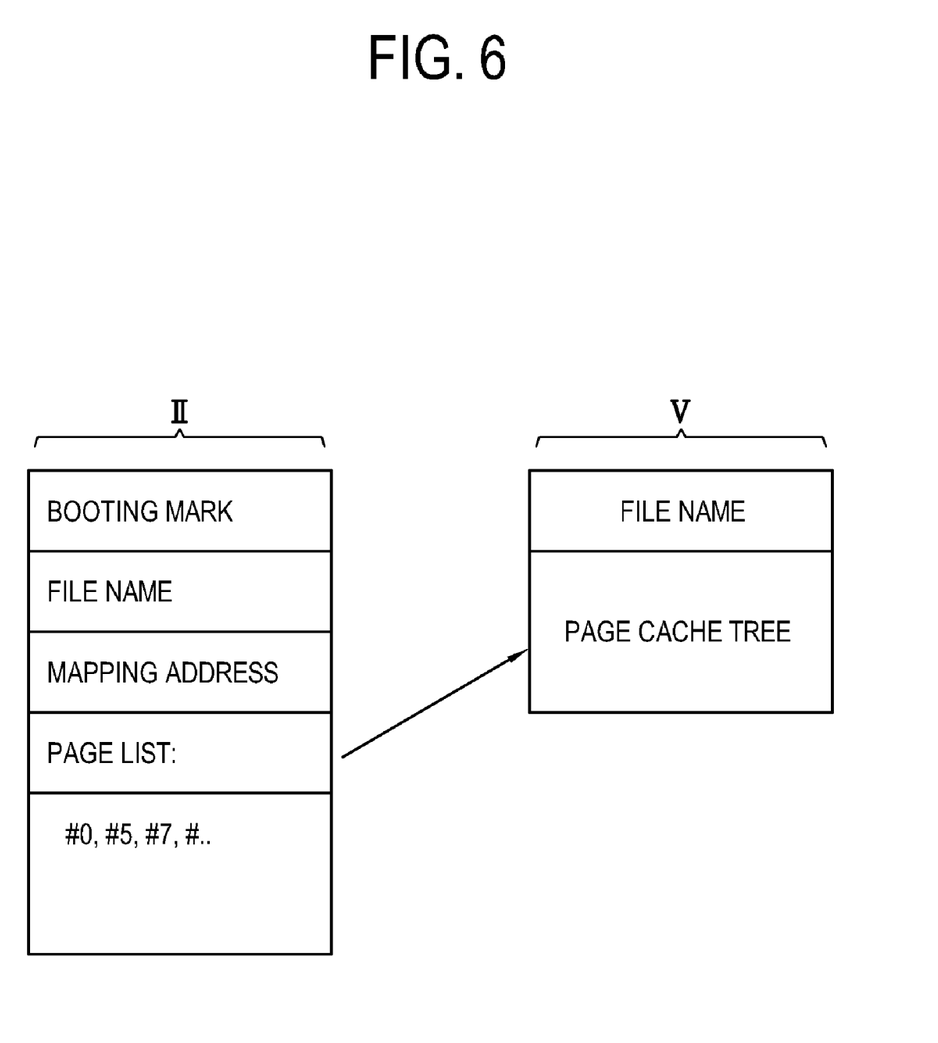
FIG. 6 illustrates a second storage unit including a page cache which is stored when rebooting the electronic apparatus in FIG. 1.

FIGS. 4, 5, and 6 are views showing the rebooting process of the electronic apparatus and the second storage unit, according to an exemplary embodiment. FIG. 4 is a control flowchart showing a rebooting process, FIG. 5 illustrates the second storage unit including a page list which is generated during the rebooting process, and FIG. 6 illustrates the second storage unit including a page cache which is generated during the rebooting process.

After the initial booting has been carried out, if the electronic apparatus is turned on again at operation S110, the device initialization file is loaded and executed as during the initial booting at operation S120.

If the kernel is executed, the controller 30 determines whether the booting mark exists in the new data area at operation S130, and determines whether to carry out the rebooting according to the existence of the booting mark. If there is no booting mark, the controller 30 determines that the initial booting has not been performed, and thus performs a memory reset at operation S141 to thereby carry out the initial booting beginning with the operation S30 of FIG. 2. The memory reset is a process of initializing a memory by the kernel in the booting process. When the memory is reset, information about the memory map is initialized to delete all data stored in the second storage unit 20.

On the other hand, if the booting mark exists, the controller 30 skips the memory reset typically performed, at operation S140. That is, the memory reset is not performed, so that the page corresponding to the device execution file and the reference information stored in the second storage unit 20 can be retained.

At operation S150, the controller 30 that skips the memory reset creates the page list on the basis of the reference information II and III. As shown in FIG. 5, the memory map III contains information about a page IV as a data block, and it is thus possible to ascertain the contents of the page through the memory map III. The controller 30 searches pages corresponding to a mapping address of a certain device execution file through the memory map III, and generates a list of the searched pages. That is, the pages #0, #5, #7, # . . . are linked to the page list storage space prepared when creating the reference information II during the initial booting, thereby creating the mapping information about the certain device execution file.

Thereafter, when the device execution file is opened for executing the device execution file, the controller 30 determines whether the name of the device execution file exists in the reference information II as shown in FIG. 6, and stores the page list corresponding to the determined device execution file in the page cache V at operation S160. Here, the page cache is also called a disk cache, and is a transparent buffer provided in the RAM which is used to enhance a speed of reading data. The page cache is created by the operating system and uses RAM-accessibility to quickly read the pages, instead of a hard disk or a flash memory. In this exemplary embodiment, the page cache is a page cache tree having a tree structure, allowing for fast searching of data, since the data also has a tree structure.

To execute the device execution file, the controller 30 does not load the data from the first storage unit 10, but instead, the controller 30 reads the data through the page list stored in the page cache tree V at operation S170. That is, if it is required to load a certain device execution file, the controller 30 searches the page cache tree V to determine whether the page list exists in the page cache tree V, and reads the linked pages of the page list when the page list exists. The controller 30 executes the device execution file through the read page.

As compared with the initial booting, the rebooting loads only the device initialization file but uses the device execution file stored in the second storage unit 20, so that time taken in loading the device execution file can be reduced, thereby shortening a booting time. Here, the difference in loaded data between the rebooting and the initial booting can be grasped by taking count of accesses from the second storage unit 20 to the first storage unit 10 such as the hard disk or the flash memory.

Conventionally, technologies for backing up an image before turning off the electronic apparatus were used to shorten the booting time of the booting process performed after the initial booting has been carried out. The conventional booting restores only the state which existed before turning off the electronic apparatus, and initializes the system, thus improving speed as compared to the initial booting but also lowering stability and reliability since the devices are not initialized. For example, data may be lost or changed at the moment when the electronic apparatus is turned off, or an error and data change may occur while restoring the image. However, the conventional booting cannot protect against such special situations.

According to an exemplary embodiment, the booting speed is improved and the initialization is also performed by the device initialization file at every booting, thereby enabling stable booting and enhancing the reliability of the booting.

While the conventional image backup technologies are troublesome and difficult in design for the rebooting since application modifications have to be performed according to hardware devices included in the system, the exemplary embodiments are effective in improving the booting speed even though the kernel is simply modified through software.

Also, if the device execution file of the electronic apparatus is executed based on a Linux operating system, design modifications of the electronic apparatus may be easily made since a the kernel is an open source application.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A booting method of an electronic apparatus comprising a non-volatile first storage unit storing a device initialization file and a device execution file, and a volatile second storage unit, the booting method comprising:
   loading the device execution file from the first storage unit into the second storage unit at an initial booting;
   generating reference information about the loaded device execution file;
   maintaining power supplied to the second storage unit when the electronic apparatus is turned off;
   loading and executing the device initialization file from the first storage unit into the second storage unit at a rebooting;
   generating a page list corresponding to page information of the device execution file using the reference information, wherein the page list is stored in a page cache; and
   executing the device execution file stored in the second storage unit with reference to the reference information.

2. The booting method according to claim 1, wherein the reference information comprises memory mapping information of the device execution file.

3. The booting method according to claim 1, further comprising:
   determining whether the reference information exists; and
   performing a memory reset for initializing the second storage unit if it is determined that the reference information does not exist.

4. The booting method according to claim 1, wherein the second storage unit has a higher processing speed than the first storage unit.

5. The booting method according to claim 1, wherein the generating the reference information further comprises generating a booting mark for indicating that the initial booting has been performed.

6. The booting method according to claim 5, wherein the rebooting is performed when the booting mark is determined to exist in the reference information.

7. The booting method according to claim 1, further comprising:
   determining whether the reference information exists; and
   skipping a memory reset for initializing the second storage unit and retaining the device execution file and the reference information stored in the second storage unit if it is determined that the reference information exists.

8. The booting method according to claim 1, wherein the reference information is generated in the form of a tree structure in the second storage unit.

9. The booting method according to claim 1, wherein the page cache comprises a page cache tree having a tree structure.

10. A electronic apparatus comprising:
   a non-volatile first storage unit in which a device initialization file and a device execution file are stored;
   a volatile second storage unit in which power supplied thereto is maintained when the electronic apparatus is turned off; and
   a controller which loads the device execution file from the first storage unit into the second storage unit and generates reference information about the loaded device execution file at an initial booting, and loads and executes the device initialization file from the first storage unit into the second storage unit and generates a page list corresponding to page information of the device execution file using the reference information, in which the page list is stored in a page cache and executes the device execution file using the page list stored in the second storage unit with reference to the reference information at a rebooting.

11. The electronic apparatus according to claim 10, wherein the reference information comprises memory mapping information of the device execution file.

12. The electronic apparatus according to claim 10, wherein the controller determines whether the reference information exists, and performs a memory reset for initializing the second storage unit if it is determined that the reference information does not exist.

13. The electronic apparatus according to claim 10, wherein the second storage unit has a higher processing speed than the first storage unit.

14. The electronic apparatus according to claim 10, wherein the second storage unit comprises a dynamic random access memory.

15. The electronic apparatus according to claim 10, wherein the reference information generated by the controller includes a booting mark for indicating that the initial booting has been performed.

16. The electronic apparatus according to claim 15, wherein the controller performs the rebooting when the booting mark is determined to exist in the reference information.

* * * * *